United States Patent [19]

Mühr

[11] 4,309,015

[45] Jan. 5, 1982

[54] VERTICAL POSITION ADJUSTER FOR SEATS, PARTICULARLY FOR MOTOR VEHICLE SEATS

[75] Inventor: Dieter Mühr, Remscheid, Fed. Rep. of Germany

[73] Assignee: Keiper Automobiltechnik GmbH & Co. KG, Remscheid, Fed. Rep. of Germany

[21] Appl. No.: 87,295

[22] Filed: Oct. 22, 1979

[30] Foreign Application Priority Data

Oct. 26, 1978 [DE] Fed. Rep. of Germany ....... 2846632

[51] Int. Cl.³ .............................................. B60N 1/06
[52] U.S. Cl. .................................... 248/396; 248/394; 248/421; 248/422; 297/330
[58] Field of Search ............... 248/396, 394, 371, 395, 248/421, 422; 74/89.15, 89.17, 89.16; 297/330

[56] References Cited

U.S. PATENT DOCUMENTS

| | | | |
|---|---|---|---|
| 2,170,923 | 8/1939 | Jacobs | 248/394 |
| 2,924,265 | 2/1960 | Himka | 248/394 X |
| 2,983,545 | 5/1961 | Garvey et al. | 248/421 |
| 3,437,302 | 4/1969 | Homier | 248/394 |
| 3,768,883 | 10/1973 | Kauffman | 108/147 X |
| 4,015,812 | 4/1977 | Heesch | 248/396 X |

*Primary Examiner*—James T. McCall
*Attorney, Agent, or Firm*—Michael J. Striker

[57] ABSTRACT

The vertical position adjuster for motor vehicle seats includes two pairs of adjusting gear units, each pair being driven by a separate motor and each unit including an input screw mechanism having its nut connected to a tooth rack which meshes with a gear segment rigidly connected to one arm of a swing support in the form of a bell crank. The apex of each bell crank is hinged to the housing of the gear unit and the other arm of the bell crank is hinged to the seat frame.

7 Claims, 6 Drawing Figures

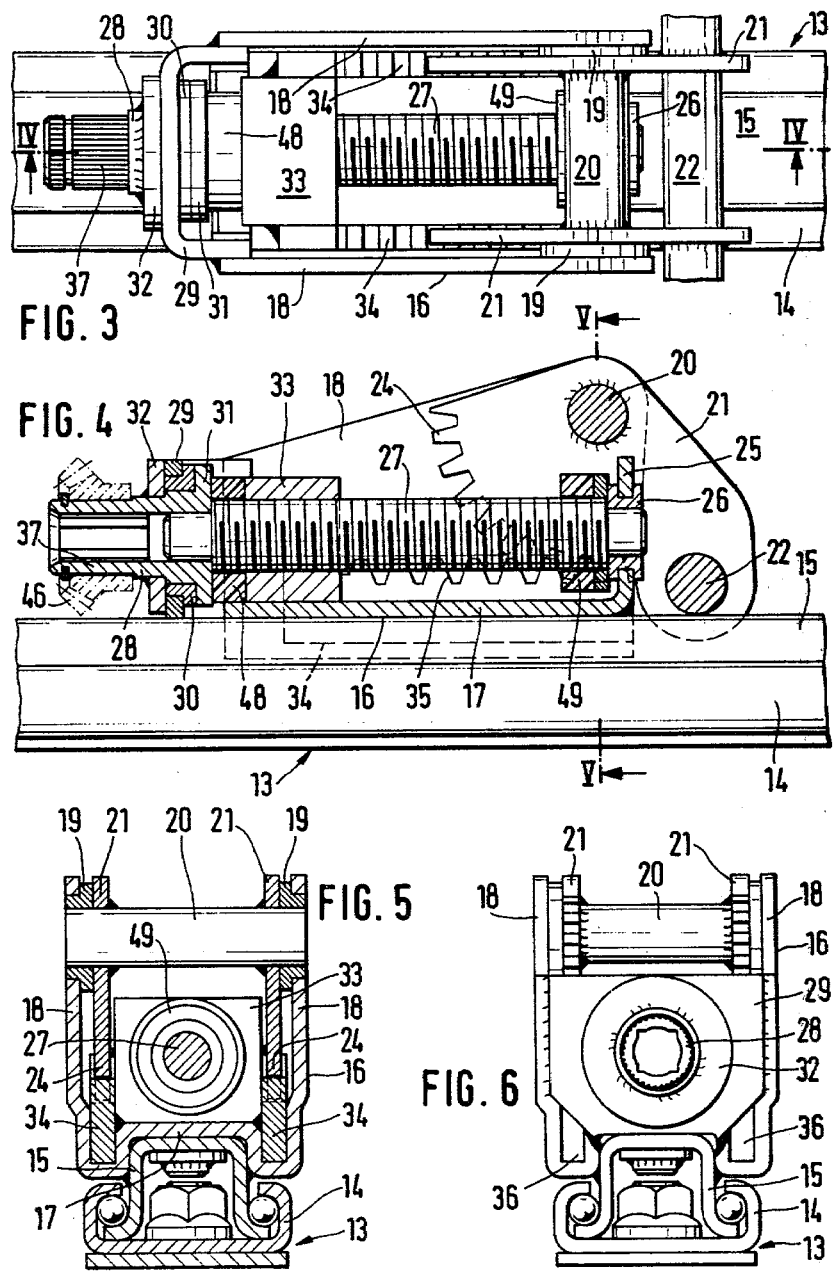

VERTICAL POSITION ADJUSTER FOR SEATS, PARTICULARLY FOR MOTOR VEHICLE SEATS

BACKGROUND OF THE INVENTION

This invention relates generally to adjusters for seats, and more particularly it relates to a vertical position adjuster for a motor vehicle seat of the type having a seat frame provided with swing supports hinged to a base frame and vertically adjustable relative to the latter by means of an adjusting device which includes adjusting gears arranged for engaging gear segments formed on the swing supports and being adapted for locking the same in the desired vertical position.

In a known vertical adjusting device of the aforedescribed type the input member of the gear unit consists of two gears arranged on a common shaft and engaging two gear segments formed on two swing supports in the front range of the seat; the gear segments are linked to the seat frame and connected via a coupling rod to swing supports arranged in the back range of the seat. The seat frame is thus connected to the base frame by the swing supports in each corner area of the seat. Upon actuation of the shaft which supports for joint rotation the gears acting as input members of the gear unit, all swing supports are simultaneously raised or lowered in accordance with the direction of rotation of the shaft. An adjusting lever is provided for the actuation of the adjusting shaft and is connected to the latter via a braking spring coupling by means of which the swing supports are positively held in their adjusted position when the adjusting lever is released. In such known vertical position adjusting devices all swing supports, according to the direction of rotation of the adjusting shaft, are either raised or lowered simultaneously, thus uniformly raising or lowering the seat frame. The disadvantage of such known adjusting devices, however, resides in the fact that it is impossible to adjust a different vertical position of the front part of the seat relative to its backrest part. In addition, the power drive for such conventional vertical position adjusters cannot be made without the employment of additional structural components such as braking spring coupling, for example.

SUMMARY OF THE INVENTION

It is, therefore, a general object of the present invention to overcome the aforementioned disadvantages.

More particularly, it is an object of the invention to provide an improved vertical position seat adjuster which enables in a very simple manner to selectively raise via power drives the entire seat frame or to lift the latter either in the range of its front edge or in the range of its backrest only.

In keeping with these objects and others which will become apparent hereafter, one feature of the invention resides, in a vertical position adjuster for motor vehicle seats having a base frame, a seat frame and four swing supports hinged between respective corner areas of the base frame and corresponding corner areas of the seat frame, in a combination which comprises four adjusting gear units assigned to respective swing supports and each having power driven input gears supported on the base frame and a gear segment secured to the assigned swing support and engaging the input gears. The adjusting gear units are power driven in pairs, one pair being driven in the range of the front side of the seat by means of one motor and the other pair is driven by another motor in the range of the backrest. By virtue of the provision of individual adjusting gear units in each corner area of the seat it is possible to attain a compact structure of each unit which in turn enables to keep a minimum interspace between the base frame and the seat frame when the seat is adjusted to its lowermost position. In addition, the two driving motors for the two pairs of adjusting gear units can be situated in the central area of the seat where sufficient installation space for these motors is available.

In a preferred embodiment of the structure of the adjusting gear unit, the input transmission means are made in the form of a screw mechanism with a power driven screw spindle engaging a screw nut connected to at least one rack which is slidably guided in the housing of the gear unit along the spindle and engages a gear segment secured to the swing support which in turn is hinged to the base frame and the seat frame.

In order to symmetrically transmit the adjusting forces to the housing of respective gear units and transfer the same without rotary moment to the base frame, the screw nut according to another feature of this invention is rigidly connected at two opposite points with a pair of racks extending parallel to the axis of rotation of the screw spindle and being movable guiding channels formed in the housing of the adjusting gear unit whereas the swing supports are formed with two juxtaposed gear segments engaging the corresponding racks.

According to another feature of this invention, the screw spindle in each adjusting gear unit is in its end areas surrounded by elastic buffer rings so that the adjusting moment introduced into each screw spindle can be softly intercepted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a plan view of an adjusting gear unit of FIG. 2 shown on an enlarged scale;

FIG. 4 is a sectional side view of the unit of FIG. 3, taken along the line IV—IV;

FIG. 5 is a sectional rear view of the unit of FIG. 4 taken along the line V—V; and FIG. 6 is a front view of the unit of FIG. 4.

DESCRIPTION OF THE PREFERRED EMBODIMENTS

Figure 1:
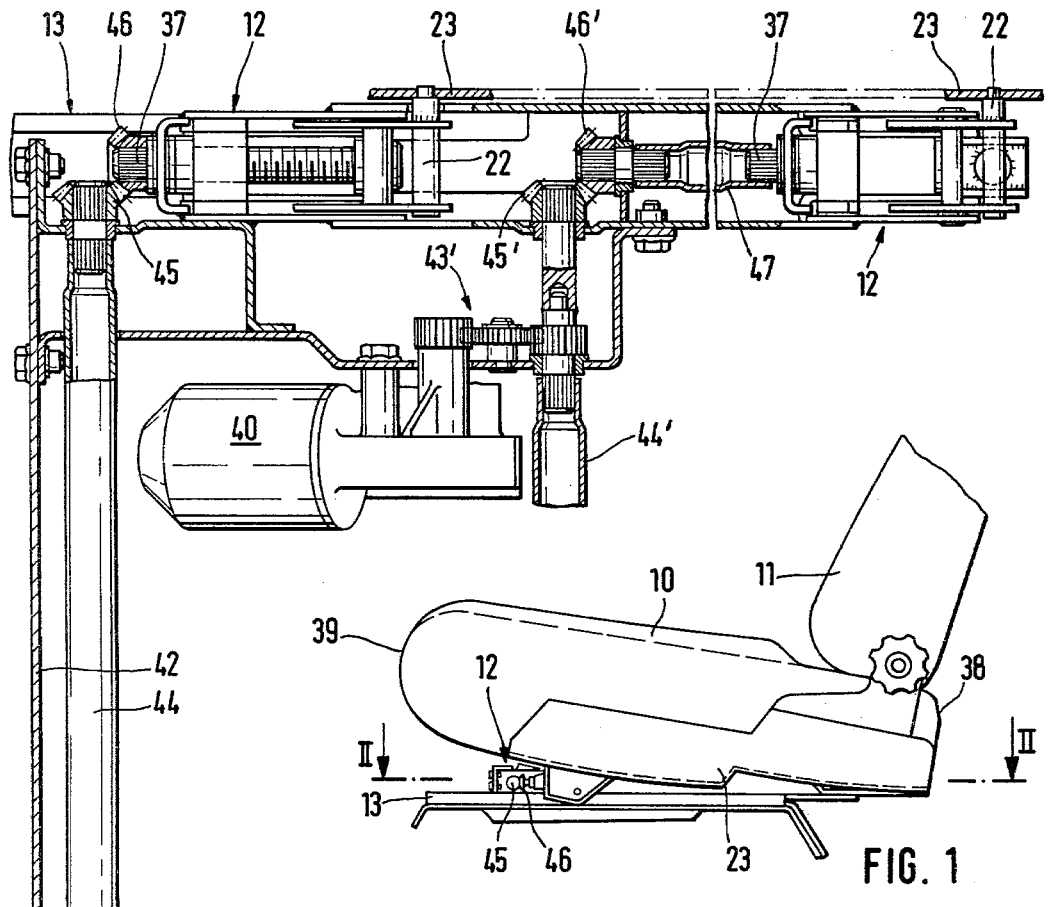
FIG. 1 is a side view of a motor vehicle seat including the vertical position adjuster of this invention.

Referring firstly to FIG. 1, a motor vehicle seat including a seat part 10 and a backrest part 11 is supported on a base frame 13 including two parallel guiding rails spaced apart from one another about the width of the seat and extending along the lateral sides of the seat part. In respective corner areas of the seat part, adjusting gear units 12 of this invention are coupled to corresponding swing supports as it will be explained below. As illustrated in FIGS. 5 and 6, the base frame 13 includes, for example, a pair of supporting rails 14 each carrying a longitudinally displaceable guide rail 15. Each of the two guide rails 15 supports two consecutively arranged adjusting gear units 12. The units 12 are spaced apart from one another about the longitudinal dimension of the seat frame 23 and each has a unit housing 16 which is secured to the guide rail 15 by welding, for example. The housing 16 is shaped of a sheet metal to have a U-shaped transverse section defining two lateral legs 18 and a bridging part 17. The bridging part 17 overlaps the guide rail 15 and the lateral legs 18 extend upwardly parallel to the side walls of the guide rail 15. Two opposite bearing bushings 19 are inserted in facing portions of the side legs 18 and support for rotation an axle 20 to which two swing supports 21 are rigidly connected for joint rotation in contact with the adjoining flanges of the bushings 19. Each of the two identical swing supports in the adjusting gear unit 12 is in the form of a bell crank having its apex connected to the aforementioned axle 20. The arms of both bell cranks in each gear unit which project outwardly are interconnected by a pin 22. The connecting pin 22 has a projecting end portion hinged to a side wall of a cup-shaped seat frame 23. The other arm of the bell crank support 21 is formed as the gear segments 24.

As seen most clearly from FIG. 4, the bridging part 17 of the housing 16 is terminated at its end which is situated approximately below the axle 20 with an angular piece 25 projecting between the lateral legs 18 of the housing. The angular piece 25 supports a bushing 26 which acts as a bearing for one end of a screw spindle 27. The other end of the spindle 27 is connected for joint rotation to a drive bushing 28 which in turn is supported for rotation in a bearing plate 29. The bearing plate 29, as seen from FIG. 3, is a U-shaped piece the legs of which are rigidly connected preferably by welding to the lateral legs 18 of housing 16. The pitch of the screw spindle 27 is preferably in the range which permits the self-locking action with the screw nut 33. A collar 30 is provided between the inner wall of the bearing plate 29 and a flange 31 of the drive bushing 28 and together with a ring 32 which is rigidly secured to the drive bushing 28 at the outer wall of the bearing plate 29 protects the screw spindle 27 against axial displacement. The actual threaded portion of the screw spindle 27 extends between the bushing 26 and the flange 31 of the drive bushing 28 and this threaded portion engages the screw nut 33. The opposite lateral walls of screw nut 33 are rigidly connected by welding, for example, to two tooth racks 34 which are slidably guided in trough-shaped bottom portion 36 of the bridging part 17 of the housing 16. The teeth of racks 34 are in mesh with the gear segments 24.

The end of the drive bushing 28 that projects through the gear unit housing 16 forms a driving shaft 37 adapted for supporting a driving member for transmitting a rotary motion to the screw spindle 27. For this purpose the outer surface of the shaft 37 is formed with splines whereas its inner walls are shaped into a substantially rectangular cross-section (FIG. 6) so that the drive bushing 28 might receive, if necessary, an end of a coupling rod of a corresponding cross-section.

Figure 2:
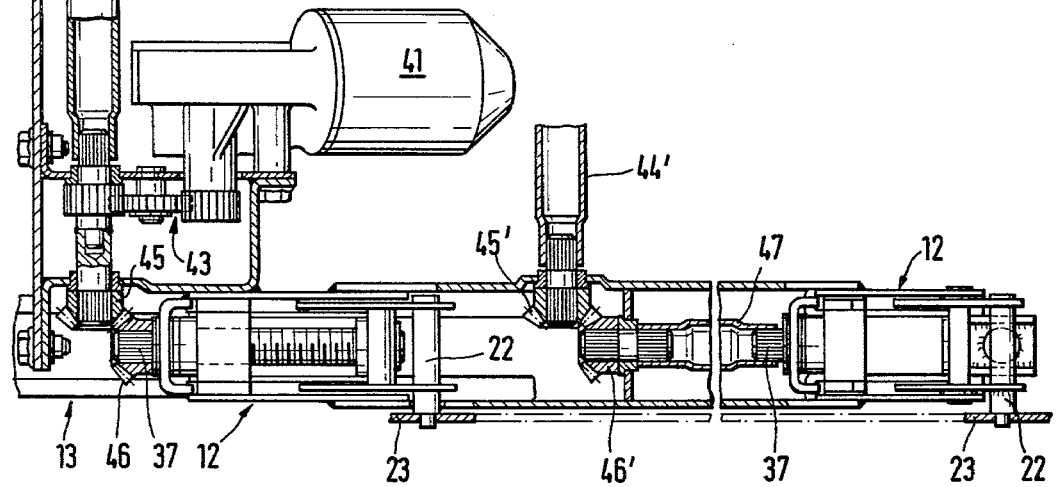
FIG. 2 is a sectional plan view of the vertical position adjuster, taken along the line II—II of FIG. 1 and shown on an enlarged scale.

In the embodiment of this invention as illustrated in FIG. 2, the adjusting gear units 21 are driven by electromotors 40 and 41 in such a manner that one electromotor 41 drives via coupling gears 43, a transmission shaft 44 and bevel gears 45 and 46 the adjusting gear units 12 assigned to the front 39 of the seat part 10, whereas the other electromotor 40 drives in a similar manner by means of coupling gears 43' a transmission shaft 44' and bevel gears 45' and 46' the pair of adjusting gear units 12 assigned to the backrest part 38 of the seat. The bevel gears 46 are directly connected to the splines of the shaft 37 to drive the front pair of adjusting gear units 12. The rear pair of the adjusting units are connected to bevel gears 46' via an additional connecting shaft 47 so that the electromotor 40 for the rear supports can also be installed in the front space below the seat 10.

When the driving motors 40 and/or 41 are activated, their rotation is transmitted to spindles 27 and the toothed racks 34 attached to the nut 33 will move in the longitudinal direction of the spindle and will rotate the gear segment 24 clockwise or counterclockwise according to the rotational sense of the driving motors 40 and 41. As a result, the connecting pins 22 and thus the linked parts of the seat frame are lifted or lowered. Inasmuch as the front part and the rear part of the seat has its adjusting units deiven by separate motors 40 and 41, it is possible to selectively activate both driving motors simultaneously or only one of them so that not only the overall vertical position of the seat can be adjusted, but also the inclined position can be adjusted by selectively driving one of the motors in opposite direction or in the same direction but for different actuation times. In order to intercept softly the rotary moments in the end positions of the screw nut there are provided elastic buffer rings 48 and 49 arranged respectively in the range of the flange 31 of the drive bushing 28 and in the range of bushing 26 of the spindle 27.

It will be understood that each of the elements described above, or two or more together, may also find a useful application in other types of constructions differing from the types described above.

While the invention has been illustrated and described as embodied in a vertical position adjuster, it is not intended to be limited to the details shown, since various modifications and structural changes may be made without departing in any way from the spirit of the present invention. For instance, it is possible to replace the electromotors by manual drives for respective adjusting gear units 12 and to couple the transmission shafts 44 and 44' to a conventional manual actuating mechanism.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vertical position adjuster for seats, particularly motor vehicle seats, comprising a base frame; a rectangular seat frame; two pairs of swing supports hinged between said base frame and said seat frame; four interchangeable adjusting gear units arranged in corner areas between said base frame and said seat frame; each gear unit having an input transmission means supported on said base frame and an output gear mechanism coupled between the assigned swing support and said input transmission means; and means for driving in pairs the input transmission means of gear units arranged at one side of the sear and of gear units arranged at the opposite side of the seat, said pairs of transmission means being driven independently one of the other.

2. A vertical position adjuster for seats, particularly motor vehicle seats, comprising a base frame; a seat frame; two pairs of swing supports hinged between said base frame and said seat frame; two pairs of adjusting gear units assigned to the respective swing supports and each gear unit having a power driven input transmission means supported on said base frame and an output gear mechanism coupled between the assigned swing support and said input transmission means; each gear unit including a housing secured to said base frame, a screw mechanism having a screw spindle supported for rotation on said housing, a screw nut on said spindle, at least one tooth rack secured to said screw nut to be displaced therewith in the direction of said spindle, and a gear segment secured to the assigned swing support and being in engagement with said tooth rack to swing said support and the hinged seat frame upwardly or downwardly according to the rotational sense of said screw spindle.

3. The adjuster as defined in claim 1, wherein one pair of said adjusting gear unit and of said swing supports is arranged at the front part of the seat and the other pair of said units and supports is arranged at the rear part of the seat.

4. The adjuster as defined in claim 3, wherein said driving means includes two driving motors each assigned to one of said pairs of adjusting gear units.

5. The adjuster as defined in claim 2, wherein each adjusting gear unit includes two parallel tooth racks secured to opposite sides of said screw nut, guiding channels formed in said unit housing for guiding said racks in the direction of said screw spindle, said swing supports being in the form of bell cranks having its apex hinged to said housing and one arm of said bell crank being formed with two parallel gear segments engaging synchronously said tooth racks and the other arm of said bell crank being hinged to said seat frame.

6. The adjuster as defined in claim 2, wherein said screw spindle in each adjusting gear unit is provided at each end thereof with elastic buffer rings to intercept the movement of said nut.

7. The adjuster as defined in claim 5, wherein both driving motors are mounted on said base frame in the interspace below the front part of the seat, and an additional transmission mechanism is provided for coupling the driving motor to the rear pair of adjusting gear units.

* * * * *